(12) United States Patent
Hoffmeister et al.

(10) Patent No.: US 11,881,965 B2
(45) Date of Patent: Jan. 23, 2024

(54) GATEWAY MODULE AND MODULE ARRANGEMENT

(71) Applicant: Festo SE & Co. KG, Esslingen (DE)

(72) Inventors: Michael Hoffmeister, Esslingen (DE); Thomas Berndorfer, Vienna (AT); Achim Ziegele, Baltmannweiler (DE); Olaf Westrik, Solms (DE); Sven Haugstetter, Leonberg (DE); Thomas Heubach, Weinstadt (DE); Matthias Prinzen, Tübingen (DE)

(73) Assignee: Festo SE & Co. KG, Esslingen (DE)

( * ) Notice: Subject to any disclaimer, the term of this patent is extended or adjusted under 35 U.S.C. 154(b) by 1132 days.

(21) Appl. No.: 16/606,474

(22) PCT Filed: Apr. 17, 2018

(86) PCT No.: PCT/EP2018/059750
§ 371 (c)(1),
(2) Date: Oct. 18, 2019

(87) PCT Pub. No.: WO2018/192911
PCT Pub. Date: Oct. 25, 2018

(65) Prior Publication Data
US 2023/0101035 A1    Mar. 30, 2023

(30) Foreign Application Priority Data
Apr. 21, 2017 (DE) ..................... 10 2017 206 769.1

(51) Int. Cl.
H04W 4/00 (2018.01)
H04L 12/66 (2006.01)
H05K 5/00 (2006.01)

(52) U.S. Cl.
CPC ........... *H04L 12/66* (2013.01); *H05K 5/0017* (2013.01)

(58) Field of Classification Search
CPC ......... H04L 12/66; H05K 5/00; H05K 5/0017
(Continued)

(56) References Cited

U.S. PATENT DOCUMENTS 11,558,491 B2 * 1/2023 Dimitrovski ............ H04L 67/10
2005/0228509 A1   10/2005 James
(Continued)

FOREIGN PATENT DOCUMENTS

DE    102011107321 A    1/2009
DE    102008019053 A1   10/2009
(Continued)

*Primary Examiner* — Marceau Milord
(74) *Attorney, Agent, or Firm* — Hoffmann & Baron, LLP

(57) ABSTRACT

A gateway module includes: a module housing, an operating device arranged on the module housing, which can be put, by user actuation, into a plurality of visually distinguishable operating device states, a first communication interface for communication with field level devices, a second communication interface for communication with an external server, and a control unit configured to receive field data from the field level devices via the first communication interface and to provide the field data to the external server via the second communication interface, wherein the control unit is further configured to provide, depending on which operating device state the operating device is in, a manipulation function for influencing the operation of the gateway module and/or the field level devices.

28 Claims, 3 Drawing Sheets

(58) Field of Classification Search
USPC .......................................................... 370/338
See application file for complete search history.

(56) References Cited

U.S. PATENT DOCUMENTS

| | | | |
|---|---|---|---|
| 2009/0116513 A1* | 5/2009 | Gray | H04W 88/16 |
| | | | 370/475 |
| 2010/0290351 A1 | 11/2010 | Toepke et al. | |
| 2011/0119507 A1 | 5/2011 | Reidt | |
| 2014/0121785 A1 | 5/2014 | Ismail et al. | |
| 2014/0169215 A1 | 6/2014 | Rajendran et al. | |
| 2015/0033312 A1* | 1/2015 | Seed | H04L 63/08 |
| | | | 709/227 |
| 2016/0274552 A1* | 9/2016 | Strohmenger | G05B 15/02 |
| 2017/0041231 A1* | 2/2017 | Seed | H04W 4/70 |
| 2017/0052524 A1* | 2/2017 | Kunz | G05B 19/0426 |
| 2018/0048558 A1* | 2/2018 | Lake | H04W 76/22 |
| 2019/0072940 A1* | 3/2019 | Schnabel | G05B 19/41855 |
| 2019/0149361 A1* | 5/2019 | Sarwar | H04L 41/0806 |
| | | | 370/254 |
| 2021/0328924 A1* | 10/2021 | Seed | H04W 4/80 |

FOREIGN PATENT DOCUMENTS

| | | |
|---|---|---|
| DE | 102011107321 A1 | 1/2013 |
| EP | 1936457 A1 | 6/2008 |

* cited by examiner

GATEWAY MODULE AND MODULE ARRANGEMENT

This application claims priority based on an International Application filed under the Patent Cooperation Treaty, PCT/EP2018/059750, filed on Apr. 17, 2018, which claims priority to DE 10 2017 206 769.1 filed on Apr. 21, 2017.

BACKGROUND OF THE INVENTION

The invention relates to a gateway module with a module housing, a first communication interface for communication with field level devices and a second communication interface for communication with an external server. The gateway module has a control unit configured to receive field data from the field level devices via the first communication interface and to provide the field data to the external server via the second communication interface. The control unit is further configured to provide a manipulation function for influencing the operation of the gateway module and/or for the operation of the field level devices.

The gateway module is designed, for example, as an Internet of Things gateway and serves to provide the field data from the field level devices to an external server. The provision of the field data takes place in particular via the Internet. In particular, the external server can be a public cloud or a private cloud. On the external server, an evaluation, in particular a statistical evaluation, of the field data can preferably take place, e.g. for diagnostic purposes. The evaluation is in particular a big-data analysis.

As mentioned, the gateway module has a manipulation function. The manipulation function is used in particular to change the operation of the gateway module and/or the field level devices, in particular by external access, for example via the first and/or the second communication interface. The manipulation function can be, for example, a configuration function with which it is possible to configure to which external server the field data should be provided. Furthermore, the manipulation function can be a control function with which the field devices can be directly influenced.

The provision of a manipulation function on such a gateway module communicating with an external server generally entails the risk that an unauthorised person may access the manipulation function from the outside and use it, for example, to retrieve field data in an unauthorised manner and/or influence the field devices in an unauthorised manner. One measure to reduce this risk is to not provide or to deactivate the manipulation function unless it is needed. The operating safety of the gateway module then depends on whether the manipulation function has actually duly not been provided or has been deactivated.

SUMMARY OF THE INVENTION

An object of the invention is to improve the operating safety of said gateway module.

The object is achieved by a gateway module according to claim 1. According to the invention, the gateway module comprises an operating device arranged on the module housing, which can be set, by user actuation, into a plurality of visually distinguishable operating device states. Furthermore, the control unit is configured to provide the manipulation function for influencing the operation of the gateway module and/or the field level devices, depending on which operating device state the operating device is in.

The manipulation function is provided depending on the current operating device state. By selecting a corresponding operating device state, the manipulation function can be not provided or can be deactivated. Because the operating device is arranged on the module housing, and the operating device states can be visually distinguished from one another, the gateway module or the operating device can very easily be put into an operating device state in which the manipulation function is not provided or is deactivated. In addition, because of the visual distinguishability of the operating device states, it is very easy to check whether the manipulation function is currently being provided or not. Overall, this reduces the risk that the manipulation function will be provided at a time when it should not be provided. Accordingly, the operating safety of the gateway module can be improved.

The field level devices are, in particular, devices that are wholly or partially in the field level and/or interact directly with a production process. In particular, the field level devices are actuators, actuator drives and/or sensors. Furthermore, the field level devices can also be devices for the field level, i.e. also devices which interact directly with the field level, for example devices which are arranged between the field level and the control level. For example, the field level devices are also input/output devices, also referred to as I/O devices below. An I/O device can be designed, for example, to receive control commands from a superordinate controller from the control level, for example a PLC, and to output signals corresponding to a field device for controlling the field device. Furthermore, an I/O device may be configured to receive sensor signals from a sensor arranged in the field level and to transmit these to a superordinate controller and/or to the gateway module.

The field data include in particular identification data for identifying the field level devices 2, for example serial numbers, product keys, revision numbers, MAC addresses and/or product names. The field data may further include device data describing the field level devices 2 and in particular their properties. Furthermore, the field data may include diagnostic information related to the field level devices 2, parameter information about field level device 2 parameters, and/or process data. Finally, the field data may also include indication data, which include, for example, a number of switching cycles, cycle times and/or time intervals between defined events in a field level device 2, and in particular serve to be able to make a prognosis regarding the remaining service life or a failure. Expediently, the external server 3 is configured to make such a prognosis.

The invention further relates to a gateway module configured as a series module, which is suitable for forming a series module arrangement together with one or more field level devices configured as series modules, comprising a first communication interface for communication with the field level devices, a second communication interface for communication with an external server, and a control unit configured to receive field data via the first communication interface from the field level devices and to provide the field data to the external server via the second communication interface, wherein the control unit is further configured to perform the communication to the field level devices and/or to the external server via an Internet of Things protocol stack.

Such a gateway module configured as a series module with an Internet of Things protocol stack makes it possible to provide an Internet of Things connection directly in a series module arrangement.

The invention further relates to a series module arrangement comprising a plurality of series modules arranged in a row in a series direction, wherein the series modules comprise a gateway module according to the invention, as well as at least one field level device, wherein the gateway module is connected to the at least one field level device via the first communication interface.

BRIEF DESCRIPTION OF THE DRAWINGS

Further embodiments of the invention are the subject of the dependent claims.

Exemplary embodiments will be explained below with reference to the drawings. Wherein.

DETAILED DESCRIPTION

Figure 1:
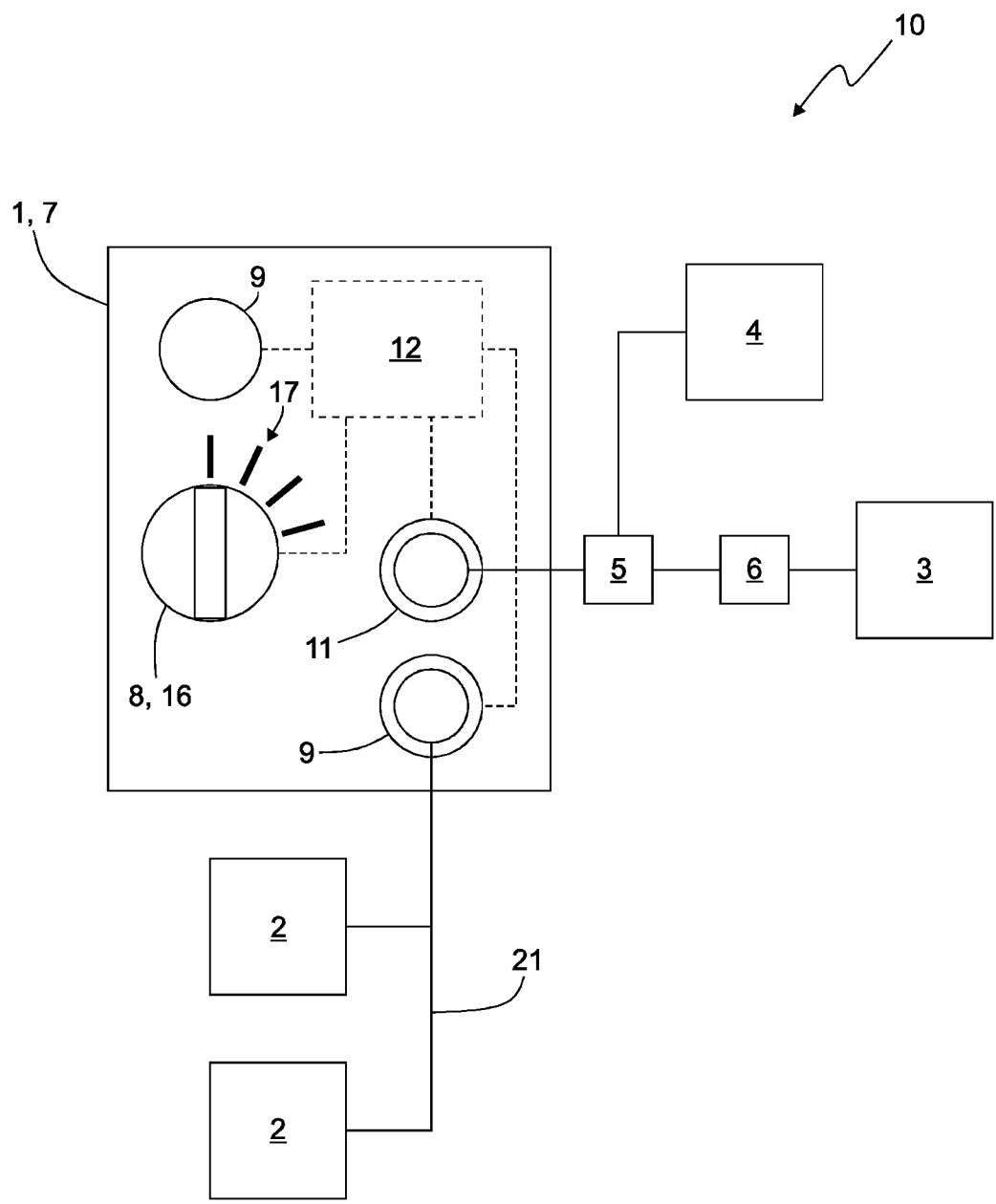
FIG. 1 shows a schematic representation of a system with a gateway module.

FIG. 1 shows a system 10 with a gateway module 1, field level devices 2, an external server 3 and a configuration unit 4. The system 10 represents a purely exemplary application of the gateway module 1.

The gateway module 1 comprises a module housing 7. The gateway module 1 further comprises an operating device 8, which is arranged on the module housing 7. The operating device 8 can be set by user actuation into a plurality of visually distinguishable operating device states. The gateway module 1 further comprises a first communication interface 9. The first communication interface 9 is used for communication with the field level devices 2. In addition, the gateway module 1 comprises a second communication interface 11. The second communication interface 11 is for communication with the external server 3. Furthermore, the gateway module comprises a control unit 12. The control unit 12 is configured to receive field data from the field level devices 2 via the first communication interface 9 and to provide the field data to the external server 3 via the second communication interface 11. Furthermore, the control unit 12 is configured to provide, depending on which operating device state the operating device 8 is in, a manipulation function for influencing the operation of the gateway module 1 and/or the field level devices 2.

Consequently, by user actuation of the operating device 8 directly on the gateway module 1, it is possible to set and visually identify directly on the gateway module 1, whether the manipulation function is provided or not.

Exemplary configurations of the gateway module 1, the system 10, a series module arrangement 20 and their components will be explained below.

As already mentioned above, FIG. 1 shows a purely exemplary application of the gateway module 1. The gateway module 1 is communicatively connected via a first communication interface 9 to two field level devices 2, by way of example. The field level devices 2 are connected exemplarily to the first communication interface 9 via a common communication line 21. The communication line 21 is, for example, a bus line, expediently an Ethernet line. Alternatively, each of the field level devices 2 may also be connected respectively via its own line to the gateway module 1. Furthermore, the field level devices 2 can also communicate wirelessly with the gateway module 1.

The gateway module 1 is communicatively connected to the external server 3 via the second communication interface 11. By way of example, the gateway module 1 is connected to the external server 3 via a local area network 5 and a wide area network 6. The local area network 5 is, for example, in particular a LAN and/or a WLAN, expediently an Ethernet-based LAN. The wide area network 6 is, for example, the Internet. Alternatively or in addition to the connection shown, the gateway module 1 can also be connected to the external server 3 in a different manner. For example, the gateway module 1 can also be connected to the external server 3 only via the local area network 5 or only via the wide area network 6. Furthermore, the gateway module 1 can also be connected to the external server 3 via a mobile radio connection. Expediently, the gateway module 1 is designed to perform encrypted communication with the external server 3 via the second communication interface 11.

The gateway module 1 basically serves to establish a connection between at least two communication systems. By way of example, the gateway module 1 establishes a connection between a first communication system, via which the external server is connected to the gateway module 1, and a second communication system, via which the field level devices 2 are connected to the gateway module 1. Expediently, the gateway module 1, in particular the control unit 12, is configured to process the data traffic passing through the gateway module 1, for example the data traffic between the first communication interface 9 and the second communication interface 11. For example, the data traffic processing may be a network address translation. Furthermore, the processing of the data traffic may be processing on the network layer or the layer 3 of the OSI model. Alternatively or additionally, the processing of the data traffic may be a processing on an application layer, for example on layer 5, 6 and/or 7 of the OSI model.

Preferably, the control unit 12 is configured to perform the communication to the field level devices 2 by means of a first protocol stack and to perform the communication to the external server 3 by means of a second protocol stack separate from the first protocol stack. The two protocol stacks may, for example, be two alike or two different protocol stacks. By way of example, both protocol stacks respectively comprise all seven layers of the OSI model.

Preferably, the control unit 12 is configured to perform the communication to the field level devices 2 and/or the external server 3 via an Internet of Things protocol stack. In particular, a protocol stack which comprises at least one Internet of Things protocol is to be referred to as an Internet of Things protocol stack. For example, the Internet of Things protocol stack includes one or more of the following protocols: Constrained Application Protocol (CoAP), Extensible Messaging and Presence Protocol (XMPP), Message Queue Telemetry Transport (MQTT), IPv6 over Low power Wireless Personal Area Network (6LoWPAN), Long Range Wide Area Network (LoRaWAN), Zigbee, Data Distribution Service (DDS), Advanced Message Queuing Protocol (AMQP) or Bluetooth Low Energy (BLE).

The gateway module 1 or the module housing 7 is provided exemplarily with a substantially cuboid basic shape.

Expediently, the front side is a side with the largest footprint. By way of example, the operating device 8 is arranged on the front side. Expediently, the first communication interface 9 and/or the second communication interface 11 is/are also arranged on the front side. The gateway module 1 can expediently be designed as a series module which is suitable for forming a series module arrangement 20 together with one or more field level devices 2 configured as series modules.

Preferably, the operating device 8 comprises an actuatable control element 16. By user actuation of the control element 16, the operating device 8 can be placed in the visually distinguishable operating device states. Expediently, the control element 16 is thereby placed in different positions. By way of example, the control element 16 is designed as a rotary switch. Accordingly, the operating device states are different rotational positions of the control element 16. Expediently, the control element 16 may also be designed as a key switch. As an alternative to the design as a rotary switch, the control element 16 can also be designed as a different switch, for example as a slide switch, or as a button, for example as a capacitive button.

By way of example, the operating device 8 comprises markings 17 which serve to improve the visual distinctiveness of the various positions of the control element 16. By way of example, one marking 17 is provided per operating device state, which marking 17 respectively indicates into which position the control element 16 is to be moved in order to set the associated operating device state. In the example shown, in which the control element 16 is designed as a rotary switch, the markings 17 are arranged distributed around the rotary switch within an angle range in which the rotary switch is rotatable. In the example shown, the markings 17 are shown as lines. Alternatively or additionally, the markings 17 may also include text, numbers and/or symbols. For example, the rotary switch may have a tab or marking that is to be aligned with the respective markings to take the various positions.

As an alternative or in addition to the markings 17, display means may also be provided to make the various operating device states visually distinguishable. As display means, for example, one or more LEDs and/or a display, such as a graphical display, may be provided.

By way of example, the operating device 8 can be put into four, preferably exactly four, different operating device states. Each operating device state is associated with a corresponding operating mode of the control unit 12, so that the control unit 12 can be put into the respectively associated operating mode by the selection of an operating device state.

Essentially, the gateway module 1 may comprise a plurality of first communication interfaces 9 for communicating with the field devices 2 and/or a plurality of second communication interfaces for communicating with an external server. By way of example, the gateway module 1 comprises at least two first communication interfaces 9 and at least one second communication interface 11. Alternatively, the gateway module 1 may comprise only a first communication interface 9.

The one or more first communication interfaces 9 comprise in particular an Ethernet interface, a bus interface, a serial interface, an interface for a subordinate communication system and/or an interface for a backplane communication system. Expediently, the first communication interfaces 9 comprise a plurality of serial interfaces. The one or more second communication interfaces 11 comprise in particular an Ethernet interface.

The control unit 12 is expediently designed as an electronic assembly. For example, the control unit 12 comprises one or more microcontrollers, ASICs and/or FPGAs. The control unit 12 is connected to the one or more first communication interfaces 9 and communicates via these with the field level devices 2. Furthermore, the control unit 12 is connected to the one or more second communication interfaces 11 and communicates via these with the external server 3. The control unit 12 is also connected to the operating device 8 and is configured to detect the current operating device state.

The control unit 12 is configured to deploy the manipulation function in dependence on the detected operating device state.

Expediently, the control unit 12 is configured to deploy the manipulation function in a first operating device state and not to deploy the manipulation function in a second operating device state different from the first operating device state. In both of these operating device states, the gateway module 1, in particular the control unit 12, is in operation.

By way of example, the operating device states include a module manipulation state. The control unit 12 is configured to provide a module manipulation function in response to the module manipulation state. The module manipulation function represents the above-mentioned manipulation function, which serves to influence the operation of the gateway module 1 and/or the operation of the field level devices 2. Expediently, the module manipulation function can be used to configure the communication partners with which the gateway module 1 communicates. The module manipulation state may also be referred to as a boarding state. In particular, the module manipulation function can be used to configure to which external server 3 the control unit 12 should provide the field data. Alternatively or additionally, the module manipulation function can be used to configure from which field level devices 2 the field data is received and/or field data from which field level devices 2 are provided to the external server 3.

The configuration as to which external server 3 the field data is to be provided takes place for example by a user input of address information or other information that identifies the external server 3. Further, in the configuration, authentication information may be input, which is required by the gateway module 1 to authenticate to the external server 3. The gateway module 1 can then initiate communication with the external server 3 by means of the entered web address and/or the authentication information in order to provide the field data thereto.

Alternatively or additionally, it is also possible for the configuration as to which external server 3 the field data is to be provided to be initiated or effected by the external server 3. In this case, the module manipulation function allows/enables configuration by the external server 3. The external server 3 can be provided with address information and/or authentication information, with which the external server 3 can initiate communication with the gateway module 1 and register in the gateway module. Expediently, the gateway module only allows the communication and/or registration if the module manipulation function is currently provided or if the module manipulation state is given.

As a result of the configuration as to which external server 3 the field data is to be provided to, at least one external server is expediently registered in the gateway module 1, to which server the field data can then be provided accordingly. Preferably, the field data can only be provided to external servers that are registered accordingly in the gateway module 1.

The configuration of from which field level devices 2 receive the field data preferably takes place by user input. For example, a user may enter the field level devices 2 individually or select them from a list. Furthermore, it is possible for this configuration to take place automatically in that the gateway module 1 independently checks, for example, which field level devices 2 are connected to the first communication interface 9. Furthermore, it is possible that this configuration takes place via a retrieval of a corresponding list from an external device, in particular the external server 3.

As a result of the configuration regarding from which field level devices 2 the field data is received, the gateway module 1 has a list of registered field level devices 2. The gateway module is configured to expediently receive and/or retrieve and/or provide to the external server 3 only the field data of the registered field level devices 2.

The module manipulation function expediently also provides the option of removing a registered external server 3 and/or a registered field level device 2 from the configuration so that field data is no longer exchanged with this server 3 or field level device 2.

The manipulation function, for example the module manipulation function, is in particular a software function. Expediently, the manipulation function may be accessed using an external device, such as the configuration unit 4 and/or the external server 3. The configuration unit 4 is, for example, a terminal, for example a PC and/or a mobile device, expediently a mobile phone, tablet, handheld device and/or a laptop. The access to the manipulation function is expediently carried out via the first communication interface 9 and/or the second communication interface 11. The manipulation function can be provided, for example, by means of a user interface. The user interface is expediently a user interface that can be displayed with a web browser. For example, the gateway module 1 has a web server or a web server software with which the manipulation function is provided, in particular as a web application.

The module manipulation function may further provide a configuration for integrating the gateway module 1 into a network, such as the local area network 5. For example, the module manipulation function may perform a configuration required for the integration using DHCP.

Expediently, one, several or all of the configurations described above are only possible when the manipulation function or the module manipulation function is provided; in particular, only when the operating device 8 is in the module manipulation state.

Optionally, in the module manipulation state, the gateway module 1 may receive field data from the field level devices 2 and/or provide it to the external server 3.

The operating device states expediently include a device manipulation state. The control unit 12 is configured to provide a device manipulation function in response to the device manipulation state. The device manipulation function represents the above-mentioned manipulation function. The field level devices 2 can be controlled and/or configured with the device manipulation function.

For example, control signals or configuration commands can be output to the field level devices 2 by means of the device manipulation function. The gateway module 1 can thus influence the operation of the field level devices 2.

Expediently, the control and/or configuration of the field level devices 2 by the gateway module 1 is only possible when the device manipulation function is provided; in particular, only when the operating device 8 is in the device manipulation state.

Preferably, in the device manipulation state, the gateway module 1 can receive field data from the field level devices 2 and/or provide it to the external server 3.

The device manipulation state may also be referred to as a read/write state.

Expediently, in the device manipulation state no change of the registered communication partners i.e. in particular the external server 3 and the field level devices 2 is possible.

Preferably, the operating device states further include a protective state. The control unit 12 is configured not to provide the manipulation function in response to the protective state. In particular, the control unit 12 is configured not to provide the above-mentioned module manipulation function and/or the device manipulation function in the protective state. Furthermore, the control unit 12 may also be designed to allow no influence or change in the operation of the gateway module 1 and/or the field level devices 2 in the protective state, except for an influence or change of the operation caused by actuation of the operating device 8. In particular, no change or influence on the operation from the outside, that is, for example, via the first and/or second communication interface 9, 11, is possible in the protective state.

Expediently, no change in the registered communication partner, i.e. in particular the external server 3 and the field level devices 2, is possible in the protective state. Furthermore, it is not possible in the protective state, in particular, to control or configure the field level devices 2 by means of the gateway module 1.

Preferably, the gateway module 1 in the protective state can receive field data from the field level devices 2 and/or provide it to the external server 3.

The protective state may also be referred to as a read state.

In addition to the states discussed above, the operating device states may include an off-line state in which no communication at all is possible via the first and/or second communication interfaces 9, 11. Expediently, the gateway module 1 is still switched on in the off-line state.

Figure 2:
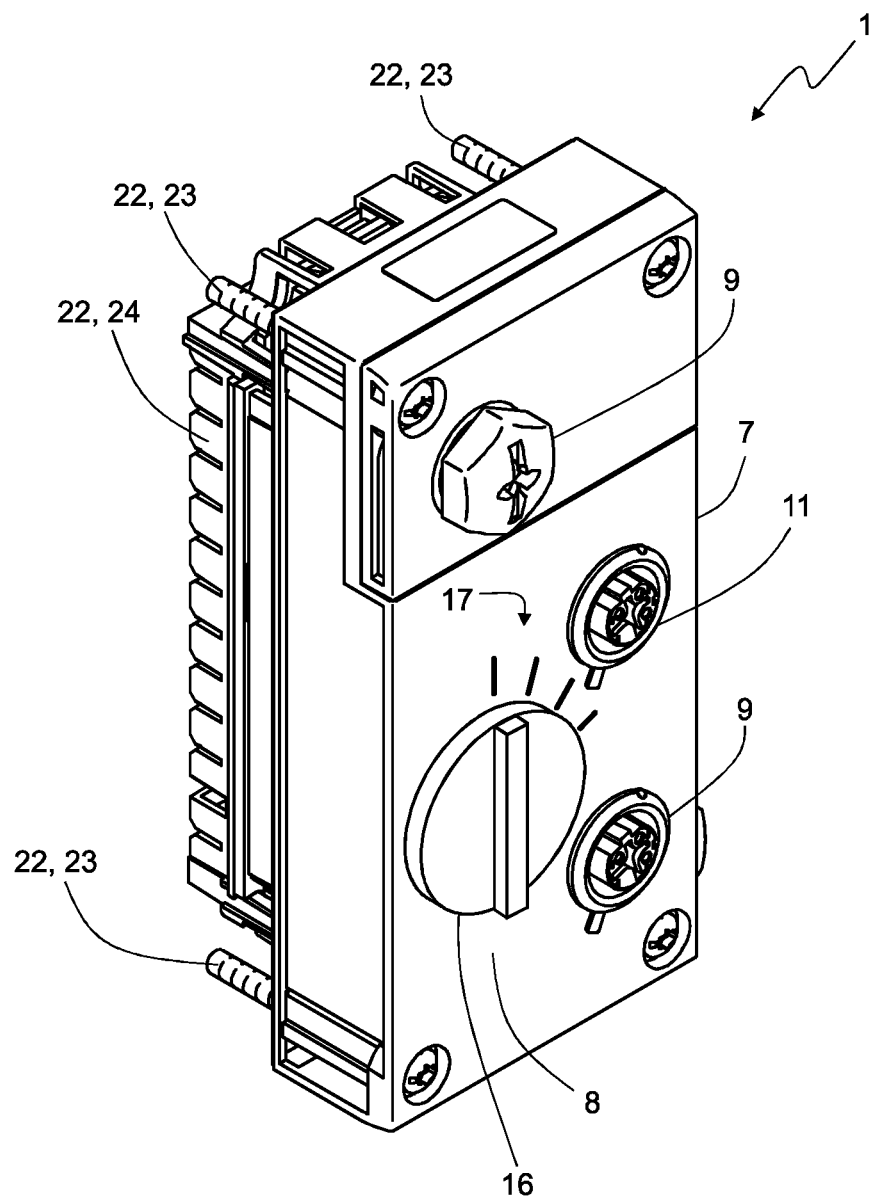
FIG. 2 shows a perspective view of a gateway module.

FIG. 2 shows an exemplary embodiment of a gateway module 1 designed as a series module, which is suitable for forming a series module arrangement 20 together with one or more field level devices 2 designed as series modules. The gateway module 1 has the first communication interface 9 already explained above and the second communication interface 11. A first communication interface 9 is covered by way of example with a protective cap.

Furthermore, the gateway module 1 has a control unit which is configured to receive field data via the first communication interface 9 from the field level devices 2 and to provide the field data to the external server via the second communication interface 11. Expediently, the control unit is further configured to communicate with the field level devices 2 and/or the external server 3 via an Internet of Things protocol stack.

The gateway module 1 designed as a series module with Internet of Things protocol stack allows provision of an Internet of Things connection directly in a series module arrangement 20.

The gateway module 1 can expediently be designed according to one of the configurations described above.

Purely optionally, the gateway module 1 designed as a series module has an operating device 8, which by way of example has a control element 16 designed as a rotary switch. The operating device 8 and the control unit can be designed as already explained above.

In particular, the gateway module 1 has a mechanical interface 22 with which the gateway module 1 can be fastened in a series module arrangement. Expediently, the mechanical interface 22 is adapted to attach the gateway module 1 on a carrier plate. Preferably, the mechanical interface 22 comprises screw means 23 and/or plug-in structures 24 for fixing the gateway module 1 on a carrier plate. The screw means 23 and/or plug-in structures 24 are arranged in particular on the rear side of the gateway module 1, so that the gateway module can be attached with its rear side on a carrier plate.

A further first and/or second communication interface can also be provided on the rear side, with which a connection to an internal communication system of a series module arrangement 20, for example a backplane communication system and/or a subordinate communication system, in particular an internal bus or a point-to-point connection, can be produced.

Figure 3:
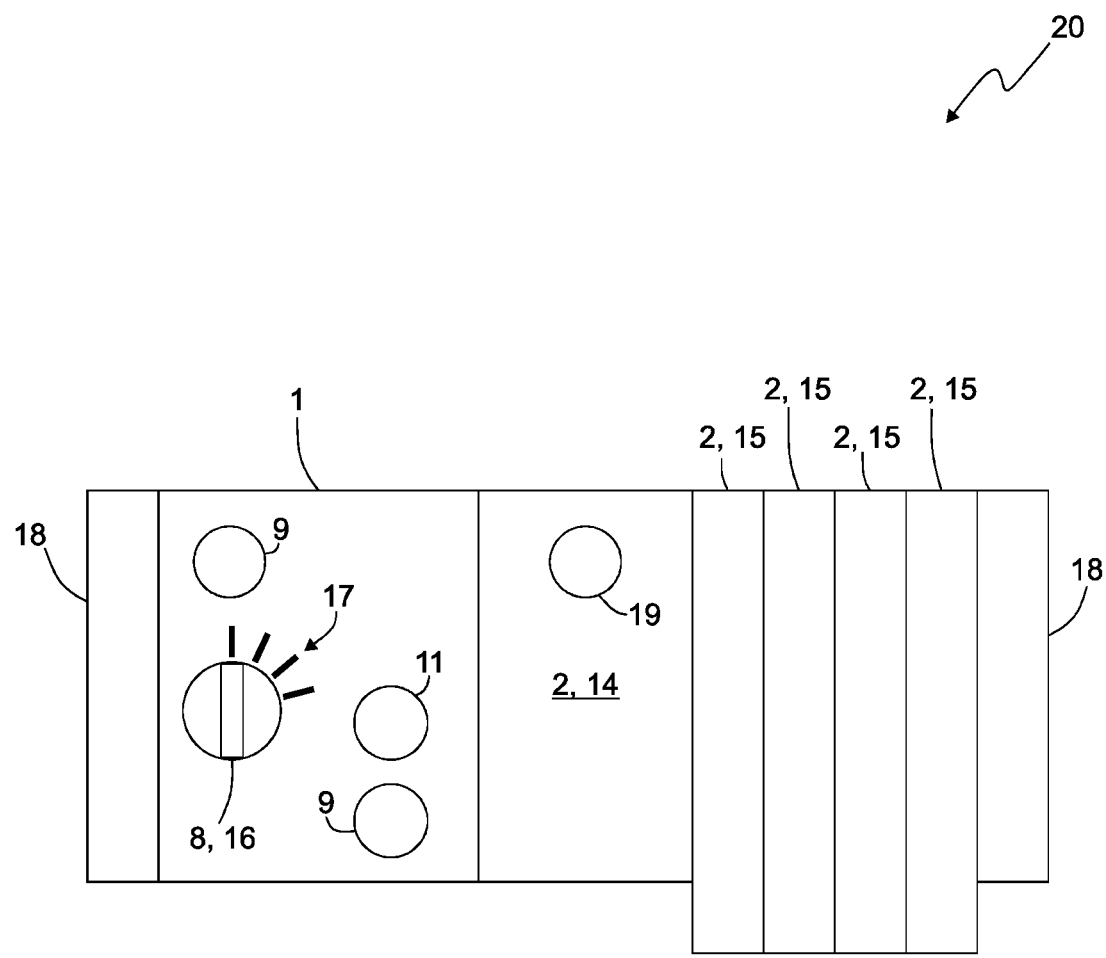
FIG. 3 shows a schematic representation of a series module arrangement.

FIG. 3 shows a series module arrangement 20 comprising a plurality of series modules arranged in a row in a series direction, wherein the series modules comprise a gateway module 1 according to a configuration described above, as well as a plurality of field level devices 2. The gateway module 1 is connected via a first communication interface to at least one field level device 2, preferably to several or all field level devices 2.

By way of example, the series module arrangement 20 has a carrier plate 18. The carrier plate 18 expediently has a substantially rectangular front side, to which the series modules are fastened. In particular, the carrier plate 18 has lines for power supply, fluid supply and/or for communication of the series modules.

By way of example, the series modules have an elongated shape and are arranged with their longitudinal axis orthogonal to the longitudinal axis of the carrier plate 18. Overall, the series module arrangement 20 has a substantially cuboid basic shape.

The series module arrangement 20 as a whole expediently represents a field device. Preferably, the series module arrangement 20 has a communication interface, with which it is connected or connectable to a superordinate controller, such as a programmable logic controller, PLC.

The series modules include, by way of example, an I/O module 14 and a plurality of valve modules 15. The I/O module 14 and the valve modules 15 represent field level devices 2 that provide their field data to the gateway module 1. The I/O module 14 is an input/output module and has an I/O port 19. The I/O module 14 is configured to receive or transmit signals from and to a sensor and/or an actuator via the I/O port 19. The valve modules 15 are exemplarily designed as valve disks; that is, their height and length are respectively a multiple of their width. The valve modules 15 are arranged by way of example with their width extension parallel to the longitudinal axis of the support plate 18, so that they occupy as little space as possible on the carrier plate 18. The valve modules 15 may in particular comprise a valve drive and/or a drivable valve member.

Furthermore, a gateway module 1 is provided, comprising: a module housing 7, an operating device 8 arranged on the module housing 7, which can be put into a plurality of visually distinguishable operating device states by user actuation, a first communication interface 9 for communication with field level devices 2, a second communication interface 11 for communicating with an external server 3, and a control unit 12 configured to receive field data from the field level devices 2 via the first communication interface 9 and to provide the field data to the external server 3 via the second communication interface 11, wherein the control unit 12 is further configured to provide, depending on which operating device state the operating device 8 is in, a manipulation function for influencing the operation of the gateway module 1 and/or the field level devices 2.

The invention claimed is:

1. A gateway module comprising:
a module housing;
an operating device arranged on the module housing, which operating device can be put, by user actuation, into a plurality of visually distinguishable operating device states;
a first communication interface for communication with field level devices;
a second communication interface for communication with an external server; and
a control unit configured to receive field data from the field level devices via the first communication interface and to provide the field data to the external server via the second communication interface, wherein the control unit is further configured to provide, depending on which operating device state the operating device is in, a manipulation function that serves to change the operation of the gateway module and/or the field level devices by external access via the first and/or the second communication interface, wherein the control unit is configured to provide the manipulation function in a first operating state and is configured not to provide the manipulation function in a second operating device state different from the first operating device state, wherein the gateway module is in operation in both these operating device states,
wherein the operating device states include a module manipulation state, and the control unit is configured to provide a module manipulation function in response to the module manipulation state, with which module manipulation function it is possible to configure to which external server the control unit provides the field data, and/or with which module manipulation function it is possible to configure from which field level devices the field data is received.

2. The gateway module according to claim 1, wherein the gateway module is designed as a series module, which is adapted to form a series module arrangement together with one or more field level devices designed as series modules.

3. The gateway module according to claim 1, wherein the operating device comprises an operable control element.

4. The gateway module according to claim 3, wherein the operable control element is a switch.

5. The gateway module according to claim 3 wherein the operable control element is a rotary switch.

6. The gateway module according to claim 3, wherein the operable control element is a key switch.

7. The gateway module according to claim 1, wherein the control unit is configured to perform the communication to the field level devices by means of a first protocol stack and the communication to the external server by means of a second protocol stack separate from the first protocol stack.

8. The gateway module according to claim 1, wherein the control unit is configured to communicate to the field level devices and/or to the external server via an Internet of Things protocol stack.

9. The gateway module according to claim 1, wherein the operating device states comprise a protective state, and the control unit is configured not to provide the manipulation function in response to the protective state.

10. The gateway module according to claim 9, wherein the control unit is configured to provide the field data to the external server in the protective state.

11. The gateway module according to claim 1, wherein the gateway module comprises a plurality of first communication interfaces for communication with the field devices and/or a plurality of second communication interfaces for communication with an external server.

12. The gateway module according to claim 1, wherein the first communication interface comprises an Ethernet interface, a bus interface, a serial interface, an interface for a subordinate communication system and/or an interface for a backplane communication system and/or the second communication interface comprises an Ethernet interface.

13. A series module arrangement comprising a plurality of series modules arranged in a row in a series direction, wherein the series modules comprise a gateway module according to claim 1, and at least one field level device, wherein the gateway module is connected via the first communication interface to the at least one field level device.

14. The series module arrangement according to claim 13, wherein the series modules comprise at least one I/O module and/or at least one valve module.

15. A gateway module comprising:
    a module housing;
    an operating device arranged on the module housing, which operating device can be put, by user actuation, into a plurality of visually distinguishable operating device states;
    a first communication interface for communication with field level devices;
    a second communication interface for communication with an external server; and
    a control unit configured to receive field data from the field level devices via the first communication interface and to provide the field data to the external server via the second communication interface, wherein the control unit is further configured to provide, depending on which operating device state the operating device is in, a manipulation function that serves to change the operation of the gateway module and/or the field level devices by external access via the first and/or the second communication interface, wherein the control unit is configured to provide the manipulation function in a first operating state and is configured not to provide the manipulation function in a second operating device state different from the first operating device state, wherein the gateway module is in operation in both these operating device states,
    wherein the operating device states comprise a device manipulation state and the control unit is configured to provide a device manipulation function in response to the device manipulation state, with which device manipulation function the field level devices can be controlled and/or configured.

16. The gateway module according to claim 15, wherein the gateway module is designed as a series module, which is adapted to form a series module arrangement together with one or more field level devices designed as series modules.

17. The gateway module according to claim 15, wherein the operating device comprises an operable control element.

18. The gateway module according to claim 17, wherein the operable control element is a switch.

19. The gateway module according to claim 17, wherein the operable control element is a rotary switch.

20. The gateway module according to claim 17, wherein the operable control element is a key switch.

21. The gateway module according to claim 15, wherein the control unit is configured to perform the communication to the field level devices by means of a first protocol stack and the communication to the external server by means of a second protocol stack separate from the first protocol stack.

22. The gateway module according to claim 15, wherein the control unit is configured to communicate to the field level devices and/or to the external server via an Internet of Things protocol stack.

23. The gateway module according to claim 15, wherein the operating device states comprise a protective state, and the control unit is configured not to provide the manipulation function in response to the protective state.

24. The gateway module according to claim 23, wherein the control unit is configured to provide the field data to the external server in the protective state.

25. The series module arrangement according to claim 24, wherein the series modules comprise at least one I/O module and/or at least one valve module.

26. The gateway module according to claim 15, wherein the gateway module comprises a plurality of first communication interfaces for communication with the field devices and/or a plurality of second communication interfaces for communication with an external server.

27. The gateway module according to claim 15, wherein the first communication interface comprises an Ethernet interface, a bus interface, a serial interface, an interface for a subordinate communication system and/or an interface for a backplane communication system and/or the second communication interface comprises an Ethernet interface.

28. A series module arrangement comprising a plurality of series modules arranged in a row in a series direction, wherein the series modules comprise a gateway module according to claim 15, and at least one field level device, wherein the gateway module is connected via the first communication interface to the at least one field level device.

* * * * *